July 31, 1956     O. C. LUNDSTROM     2,757,341
ULTRAHIGH FREQUENCY ENERGY SWITCH
Filed March 13, 1952

INVENTOR
OSCAR C. LUNDSTROM
BY
Paul B. Hunter
ATTORNEY

United States Patent Office 2,757,341
Patented July 31, 1956

2,757,341
ULTRAHIGH FREQUENCY ENERGY SWITCH

Oscar C. Lundstrom, Redondo Beach, Calif., assignor to Sperry Rand Corporation, a corporation of Delaware Application March 13, 1952, Serial No. 276,300

14 Claims. (Cl. 333—7)

This invention relates generally to amplitude modulation of ultra high frequency radio waves, and, more particularly, to electromechanical apparatus for alternately switching energy transmitted in a hollow wave guide to two separate loads.

Wave guide modulators and switches have been heretofore proposed, such as that described in Patent No. 2,544,715 to R. B. Muchmore, in which a wave interceptor or shutter is caused to pass through a transverse slot in a wave guide transmitting ultra high frequency energy to a load. The shutter is generally in the form of a wheel having a plurality of spaced blades around the periphery, the wheel being rotated at high speed by an electric motor. As the shutter blades pass through the slot, energy is reflected back to the source, the flow of energy to the load being momentarily interrupted. Thus energy received by the load is modulated at a frequency determined by the number of blades on the shutter and the velocity at which the blades are moving.

A modulator of this type has several limitations which restrict its general application. For one thing, there is a practical limitation in the transition time between the condition of maximum and minimum transmission, which time may be excessive for certain applications where very close approximation to square wave modulation is essential. In a modulator as described in the Muchmore patent cited above, this transition time, or, rise time as it is referred to when discused in terms of the resulting modulation wave shape, can readily be improved for a given modulation frequency only by increasing the linear speed of the shutter blades, as by increasing the diameter of the shutter wheel or increasing its angular velocity. There is a practical limit to the extent the diameter and speed can be increased before the centrifugal forces, vibration, and windage become excessive.

Another difficulty with the prior art modulators is that in order to increase the frequency of modulation, each blade is narrowed and the number of blades increased in order to keep the outer diameter and revolutions per minute of the shutter wheel from becoming unreasonably large. However, the narrower the blade, the more chance for leakage of energy past the blade, so that the percentage of modulation is decreased and the rise time is increased making the wave shape poorer. Thus, the modulator of Muchmore is described as achieving only about 70% modulation.

Where the modulator is used as a means for switching energy from one load to another, during the time energy is intercepted and reflected by the shutter blade, it is desirable that the energy reflected be absorbed by another load and not be reflected back to the generator. Thus, it has been the practice to couple the source to two or more loads with shutter means for intercepting the flow of energy alternately to each load. So that all the energy reflected by one shutter will be absorbed by the other load, it is necessary that the reflected energy be so phased that it adds to the energy being transmitted to the other load. In maintaining a match during the transition period, i. e., during the time when energy is switched from one load to the other, difficulty is encountered because the phase of the reflected energy shifts during this interval. The result is a mismatch between the reflected energy and transmitted energy during the transition period, which in certain high power applications is undesirable where best efficiency of operation requires that the total output energy of the source absorbed by the loads remain substantially constant during the transition period to prevent excessive reflection of energy back to the generator.

It is the general object of this invention to avoid and overcome the foregoing and other difficulties in and objections to the prior art practices by the provision of a mechanical microwave modulator which has a faster rise time, greater percentage of modulation at higher modulation frequencies, and better impedance match during the transition period.

Another object of this invention is to provide tunable means for adjusting the microwave modulator for improved operation over a range of microwave frequencies.

Another object of this invention is the provision of a mechanical switch for a wave guide transmission system having tunable elements which do not obstruct the direct transmission path between the generator and respective loads.

These and other objects of the invention which will become apparent as the description proceeds are achieved by the provision of an apparatus including a pair of magic tees with a source of microwave energy coupled to the shunt arm of each of the tees. The series arms of the respective magic tees are connected to separate loads. The magic tees are so positioned that one of the collinear arms of each of the magic tees terminates at a diametrically opposite portion of a motor driven rotary shutter from the corresponding arm of the other magic tee. Axially aligned with each of these collinear arms on the opposite side of the shutter is a shorted wave guide stub. A filter network, including an inductive iris and adjustable probe, is provided in each of the collinear arms of the magic tees, the filters giving improved performance in a manner which will hereinafter become apparent.

For a better understanding of the invention, reference should be had to the accompanying drawings, wherein.

Figure 1:
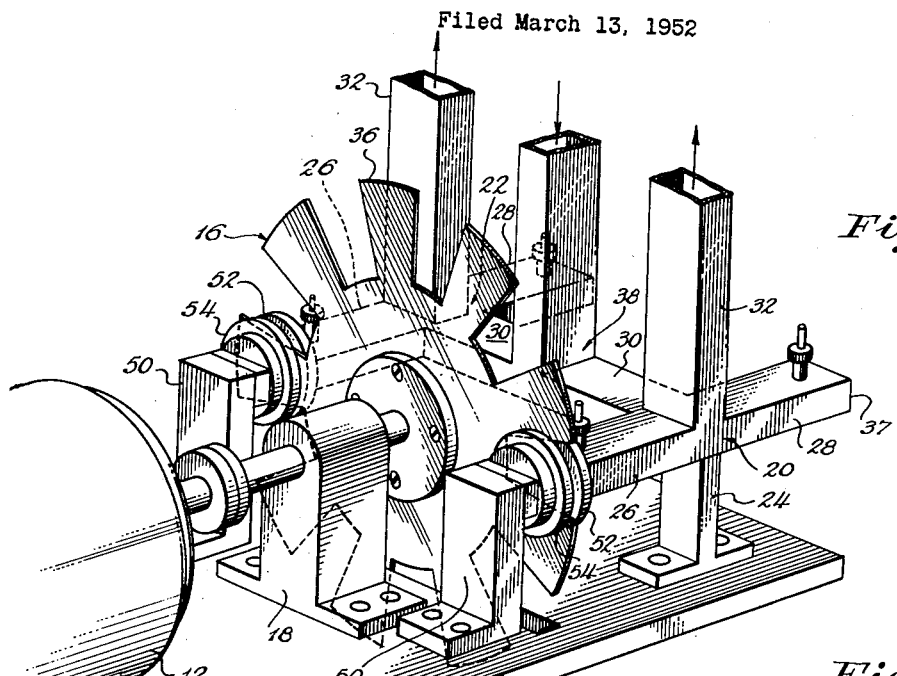
Fig. 1 is a perspective view of the modulator of the present invention.
Figure 2:
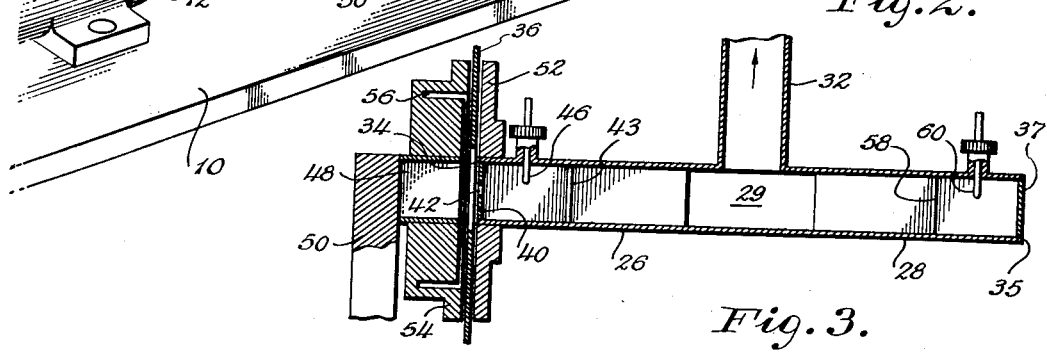
Fig. 2 is a fragmentary longitudinal cross-sectional view of the collinear arms of one of the magic tees.
Figure 1A:
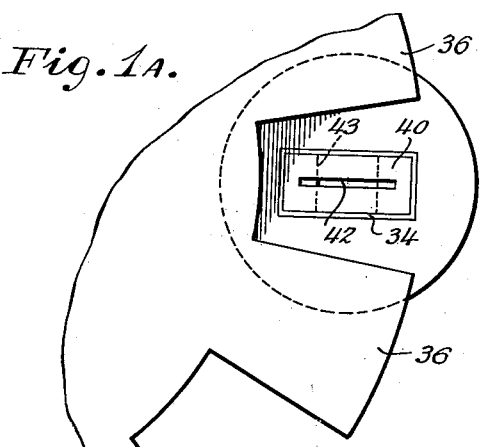
Fig. 1A is an enlarged fragmentary view of one of the collinear arms and the resonant slot in the end of the collinear arm.

Referring to the particular embodiment of the invention illustrated in the drawings, the numeral 10 indicates generally a base on which is mounted an electric motor 12 which is coupled by means of a shaft 14 to a shutter wheel 16. The shaft and shutter wheel assembly is journaled for rotation in a suitable bearing block 18 secured to the base 10. Shaft 14 is normally rotated by the motor 12 at speeds of the order of 3600 revolutions per minute, so that it is essential that the bearing block be designed to provide a rigid and vibration-free support.

In accordance with the principles of the invention, a pair of magic tees, or hybrid tee junctions as they are sometimes referred to, indicated generally at 20 and 22, are provided, the magic tees being rigidly supported from the base 10 by means of suitable support brackets 24 which are preferably welded or brazed to the magic tees, and bolted or otherwise secured to the base 10.

Magic tees 20 and 22 each include a pair of collinear arms 26 and 28 constructed of rectangular wave guide sections. Additional wave guide sections 30 and 32 having the same cross-sectional dimensions as the collinear arms 26 and 28 are joined at a common junction 29 with the collinear arms, the wave guide sections 30 and 32 being joined respectively to the H-plane and E-plane of the collinear wave guide sections. Wave guide section 30, which is joined to the H-plane of the collinear arms at the common junction 29, is commonly referred to as the shunt arm of the magic tee, while the wave guide section 32 which is joined in the E-plane of the collinear arms at the common junction 29, is commonly referred to as the series arm of the magic tee. Thus, the magic tees can be said to include a shunt arm 30 and a series arm 32 connected to a pair of collinear arms 26 and 28 at a common junction 29. The two magic tees 20 and 22, with their component parts as hereinafter described, are identical in all respects except that they are mirror images of each other.

The theory of operation of the magic tees is somewhat complex and has been extensively discussed in the literature and so will not be considered in detail in the present discussion. For example, see "Microwave Transmission Design Data" by T. Moreno, McGraw Hill, 1948, page 179. Suffice it to say for the purpose of the present invention that one of the basic properties of the magic tee is that when both collinear arms are terminated in equal impedances, as, for example, by being shorted at the ends thereof, with both collinear arms being of substantially equal length, maximum reflection of energy takes place at the common junction 29 with negligible transmission of energy between the series and shunt arms being effected. Any unbalance of the reactive loads terminating the collinear arms results in some transmission of energy between the shunt and series arms, the percent transmission depending upon the degree of unbalance. If one of the collinear arms presents an open circuit with the other arm being shorted, maximum transmission of energy will take place between the shunt and series arms with practically negligible reflection at the common junction 29.

The outer extremity 34 of the collinear arms 26 is terminated in an open circuit while the outer extremity 35 of the collinear arms 28 is terminated in a short circuit, the short circuit being provided by a metal plate 37 across the end of the wave guide section. The change in impedance presented by the magic tee by phase changes in the reactive termination of one of the collinear arms is utilized in the present invention by positioning the open end 34 of each of the collinear arms 26 adjacent the plane of the shutter wheel 16. The shutter wheel 16 is provided with a plurality of radially extending spokes or blades 36 around the periphery thereof which are rotated past the open ends 34 of the collinear arms 26, the shutter wheel providing an alternate open and short circuit termination for the adjacent collinear arms. The spokes 36 are so spaced and the magic tees are so positioned that when one of the spokes is over the end of one of the magic tees, the other magic tee has its collinear arm 26 in alignment with one of the open spaces between the spokes, so that when one magic tee has both of its collinear arms terminated in a short circuit, the other magic tee has one of its collinear arms terminated in an open circuit.

Energy from a suitable ultra high frequency source (not shown) is coupled to the shunt arms 30 of the magic tees through an E-plane or series tee, indicated generally at 38. The junctions 29 of the magic tees 20 and 22, the junctions being defined as the point of intersection between the central longitudinal axes of the respective wave guide sections, are critically spaced from the junction of the E-plane tee 38, the spacing being such that the energy reflected from one of the magic tees adds in phase with the energy from the source transmitted through the other magic tee. Thus, the entire energy from the signal source is transmitted through one or the other of the magic tees as the impedance of the respective magic tees is changed by the rotation of the shutter wheel 16.

It will be appreciated that the shorter the transition time from open circuit condition to short circuit condition of the termination of the collinear arms of the magic tees as the blades of the shutter wheel pass across the open ends 34, the more nearly the rise time approaches zero, the transition time directly affecting the sharpness of cut-off. The transition time can be considerably improved by providing each of the open ends 34 with a diaphragm 40 having a resonant aperture in the form of a slit 42 therethrough. The effect of the resonant aperture is to reduce the distance the edge of the blade must travel in completing the transition from a short to open or open to short circuit condition, thus reducing the transition time without materially affecting the electrical properties of the termination.

Although with the fixed resonant aperture (the dimensions of which are controlled by the operating frequency of the ultra high frequency energy transmitted by the switch and the maximum power to be handled by the switch) with a given shutter speed, the transition time is essentially fixed, further significant improvement in the wave shape to give better rise time of the modulated output signal is achieved by the addition of adjustable passive networks in the collinear arms 26. Each passive network includes a diaphragm 43 having a window providing an inductive iris positioned in each of the collinear arms 26, and an adjustable tuning probe 46 positioned intermediate the diaphragm 43 and diaphragm 40. While the susceptance value of the window is not critical, the spacing from the resonant diaphragm has been found to have an appreciable effect on the performance. The probes are added to provide a ready means of introducing slight adjustable tuning of the system.

Figure 3:
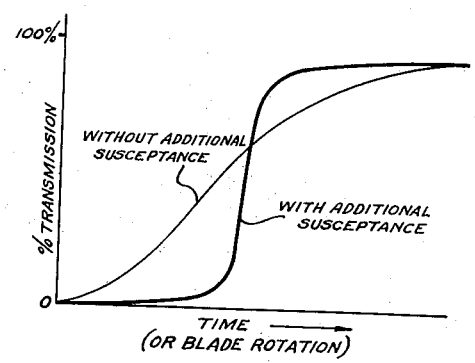
Fig. 3 is a graphical representation of the change in percent transmission of a magic tee junction with change in angular position of the shutter blade.

As has been pointed out above, passing of a blade into and out of position adjacent one of the resonant apertures 42 changes the terminating impedance of the corresponding collinear arm 26 from a short circuit to an open circuit condition or vice versa. Change in termination impedance in turn affects the percent transmission of energy from the shunt arm to the series arm of the magic tee correspondingly from substantially zero to substantially 100%. However, the relationship between the change in termination impedance to the change in percent transmission of the magic tee is not linear. By the addition of a susceptance in each of the collinear arms 26 at the proper position with respect to the diaphragm 40, it has been found that the termination impedance can be made to change more rapidly in that range of termination impedances which affects the maximum change in percent transmission at the magic tee junction. Although a change in termination impedance from zero to infinity is required to achieve the maximum change from zero to 100% transmission at the magic tee junction, it is not necessary to have an infinite impedance termination of the line to obtain a substantial transmission of energy at the magic tee junction, so, although the time for transition from open circuit is fixed by the size of the resonant slit 42 and speed of the shutter blades 36, by the addition of suitable passive networks in the collinear arms 26, essentially complete change from cut-off to full transmission by the magic tee can be obtained in a small fraction of the total transition time, as illustrated by the graph of Figure 3. By addition of the passive network considerable improvement in the rise time of the modulated output signal can thus be achieved.

In order to provide better termination of the collinear arms 26 when the shutter wheel is in the open position and to prevent radiation and energy loss from the open end of each of the collinear arms, a shorted wave guide section or stub 48 is provided and positioned in axial alignment with each of the open ends 34 of the respective collinear arms 26, the stubs being spaced from the ends 34 of the collinear arms 26 a sufficient distance to permit the shutter blades 36 to pass therebetween. Each of the stubs is supported by suitable means, as by brackets 50, from the base 10. The length of the stubs is designed to provide an infinite impedance load when the shutter wheel is in open position, the length of the shorted stub 48 being somewhat more than a quarter wavelength because of the effect of the addition of the inductive irises provided by diaphragms 43.

To prevent radiation and loss of energy at the gap provided between the collinear arms 26 and adjacent stubs 48, a pair of spaced parallel flanges 52 and 54, secured respectively to the adjacent ends of the collinear arms 26 and stubs 48, are provided. Clearance for the shutter blade through the gap is kept at a practical design minimum, and, in addition, the flanges 54 are provided with a quarter wavelength annular slot 56 which serves as a choke to further reduce loss of energy past the shutter blade in the gap.

To balance the passive networks in each of the collinear arms 26, a similar network including an inductive iris 58 and an adjustable probe 60 is provided in each of the collinear arms 28. By proper adjustment of the passive networks in the collinear arms 28, a modulation of 100% can be achieved, the impedance of the collinear arms 28 being thereby matched to the impedance of the collinear arms 26 when the shutter blades are in the shorting position. Thus, regardless of slight leakage of energy past the shutter blades when they are in the shorting position, no energy need be transmitted to the load connected to the series arm 32, it being a characteristic of the magic tee that a balance of the collinear arms results in 100% reflection at the junction.

By way of one example only, a modulating switch as illustrated in the drawings may be designed to have the following characteristics:

Input energy frequency—5070 mc.
Wave guide wavelength—3 inches (approx.).
Modulation frequency—540 cycles per second.
Rise time of the modulated output signal—100 microseconds.
Insertion loss of the switch—1.5 db.
Maximum additional loss in switching—1.1 db.
Maximum VSWR during the transition period—2:1.

The important dimensions of a switch having the above characteristics are as follows:

Wave guide inside cross section—1⅞" x ⅞".
Distance between magic tee junctions—9.306".
Susceptance of the inductive windows—j4 (normalized).
Position of the inductive irises—2.655" either side of the magic tee junction 29.
Position of the resonant apertures—4.015" distant from the magic tee junction 29.
Length of shorted collinear arms—3.975" from the magic tee junction 29.
Length of shorted stubs—.900".
Thickness of shutter blade—.050".
Clearance between the blade and ends 34 of the collinear arms—.003".

By utilizing magic tees in the manner above described, the objects of the invention have been achieved by providing a mechanical switch for ultra high frequency energy which gives considerable improvement in rise time (of the order of 3:1 over known prior art switches) and improved symmetry of wave shape. The switch is capable of handling very high radio frequency power with a maximum additional power loss over the insertion loss of the switch of only 1.1 db. during the transition period of switching from one output load to the other.

By employing magic tees and varying the phase angle of the reactive termination of the collinear arms, tunable reactive networks can be introduced into the system to improve the rise time without affecting the transmission efficiency of the switch. In prior art switches where blades are used to directly interrupt the transmission of energy to the load, passive networks could not be effectively introduced in the line to improve the rise time without introducing a discontinuity in the transmission line giving rise to standing waves. By using magic tees as described the small loss of energy at the gaps provided for passage of the shutter blades does not affect materially the percent modulation or rise time.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. Apparatus for alternately coupling each of two loads to a common ultra high frequency energy source, said apparatus comprising a pair of magic tees, each magic tee including a pair of collinear arms, a shunt arm, and a series arm connected at a common junction, a series tee connecting the respective shunt arms to the common source, the series arms being connected respectively to the two loads, a shorting means positioned at the end of and terminating one of the collinear arms of each of the magic tees, a diaphragm having a resonant slot positioned at and terminating the end of the other of the collinear arms of each magic tee, a shorted stub positioned opposite each of the resonant slot diaphragm terminated collinear arms, the stubs being axially aligned with the collinear arms and spaced therefrom to provide a gap therebetween, a rotatably supported shutter wheel, a plurality of blades extending radially outwardly around the periphery of the shutter wheel, the wheel being positioned for movement of the blades through the respective gaps between the stubs and adjacent collinear arms, a diaphragm having an inductive window positioned in each of the collinear arms of the magic tees, adjustable tuning probes extending into each of the collinear arms intermediate the ends thereof and the inductive windows, and means coupled to the shutter wheel for rotating the shutter wheel at high speed whereby the blades alternately balance and unbalance the magic tees for controlling the transmission of energy therethrough to the respective loads.

2. Apparatus for alternately coupling each of two loads to a common ultra high frequency energy source, said apparatus comprising a pair of magic tees, each magic tee including a pair of collinear arms, a shunt arm, and a series arm connected at a common junction, a series tee connecting the respective shunt arms to the common source, the series arms being connected respectively to the two loads, shorting means positioned at the end of and terminating one of the collinear arms of each of the magic tees, a diaphragm having a resonant slot positioned at and terminating the end of the other of the collinear arms of each magic tee, a shorted stub positioned opposite each of the resonant slot diaphragm terminated collinear arms, the stubs being axially aligned with the collinear arms and spaced therefrom to provide a gap therebetween, a rotatably supported shutter wheel, a plurality of blades extending radially outwardly around the periphery of the shutter wheel, the wheel being positioned for movement of the blades through the respective gaps between the stubs and adjacent collinear arms, a diaphragm having an inductive window positioned in each of the collinear arms of the magic tees, and adjustable tuning probes extending into each of the collinear arms intermediate the ends thereof and the inductive windows.

3. Apparatus for alternately coupling each of two loads to a common ultra high frequency energy source, said apparatus comprising a pair of magic tees, each magic tee including a pair of collinear arms, a shunt arm, and a series arm connected at a common junction, a series tee connecting the respective shunt arms to the common source, the series arms being connected respectively to the two loads, shorting means positioned at the end of and terminating one of the collinear arms of each of the magic tees, a diaphragm having a resonant slot positioned at and terminating the end of the other of the collinear arms of each magic tee, a shorted stub positioned opposite each of the resonant slot diaphragm terminated collinear arms, the stubs being axially aligned with the collinear arms and spaced therefrom to provide a gap therebetween, a movable shutter means positioned for movement through the respective gaps between the stubs and adjacent collinear arms, a diaphragm having an inductive window positioned in each of the collinear arms of the magic tees, and adjustable tuning probes extending into each of the collinear arms intermediate the ends thereof and the inductive windows.

4. Apparatus for alternately coupling each of two loads to a common ultra high frequency energy source, said apparatus comprising a pair of magic tees, each magic tee including a pair of collinear arms, a shunt arm, and a series arm connected at a common junction, a series tee connecting the respective shunt arms to the common source, the series arms being connected respectively to the two loads, shorting means positioned at the end of and terminating one of the collinear arms of each of the magic tees, a shorted stub positioned opposite each of the non-shorted collinear arms, the stubs being axially aligned with the collinear arms and spaced therefrom to provide a gap therebetween, movable shutter means positioned for movement through the respective gaps between the stubs and adjacent collinear arms, a diaphragm having an inductive window positioned in each of the collinear arms of the magic tees, and adjustable tuning probes extending into each of the collinear arms intermediate the ends thereof and the inductive windows.

5. Apparatus for alternately coupling each of two loads to a common ultra high frequency energy source, said apparatus comprising a pair of magic tees, each magic tee including a pair of collinear arms, a shunt arm, and a series arm connected at a common junction, means connecting the respective shunt arms to the common source, the series arms being connected respectively to the two loads, shorting means positioned at the end of and terminating one of the collinear arms of each of the magic tees, a shorted stub positioned opposite each of the non-shorted collinear arms, the stubs being axially aligned with the collinear arms and spaced therefrom to provide a gap therebetween, movable shutter means positioned for movement through the respective gaps between the stubs and adjacent collinear arms, inductive susceptance means positioned in each of the collinear arms of the magic tees, and adjustable tuning means extending into each of the collinear arms intermediate the ends threeof and the inductive susceptance means.

6. Apparatus for alternately coupling each of two loads to a common ultra high frequency energy source, said apparatus comprising a pair of magic tees, each magic tee including a pair of collinear arms, a shunt arm, and a series arm connected at a common junction, means connecting at a common junction, means connecting the respective shunt arms to the common source, the series arms being connected respectively to the two loads, shorting means positioned at the end of and terminating one of the collinear arms of each of the magic tees, a shorted stub positioned opposite each of the non-shorted collinear arms, the stubs being axially aligned with the collinear arms and spaced therefrom to provide a gap therebetween, movable shutter means positioned for movement through the respective gaps between the stubs and adjacent collinear arms, and passive network means positioned in each of the collinear arms of the magic tees.

7. Apparatus for alternately coupling each of two loads to a common ultra high frequency energy source, said apparatus comprising a pair of magic tees, each magic tee including a pair of collinear arms, a shunt arm, and a series arm connected at a common junction, means connecting the respective shunt arms to the common source, the series arms being connected respectively to the two loads, shorting means positioned at the end of and terminating one of the collinear arms of each of the magic tees, a shorted stub positioned opposite each of the non-shorted collinear arms, the stubs being axially aligned with the collinear arms and spaced therefrom to provide a gap therebetween, movable shutter means positioned for movement through the respective gaps between the stubs and adjacent collinear arms, and passive network means positioned in each of the collinear arms adjacent the shutter means.

8. Apparatus for alternately coupling each of two loads to a common ultra high frequency energy source, said apparatus comprising a pair of magic tees, each magic tee including a pair of collinear arms, a shunt arm, and a series arm connected at a common junction, means connecting the respective shunt arms to the common source, the series arms being connected respectively to the two loads, shorting means positioned at the end of and terminating one of the collinear arms of each of the magic tees, a shorted stub positioned opposite each of the non-shorted collinear arms, the stubs being axially aligned with the collinear arms and spaced therefrom to provide a gap therebetween, and movable shutter means positioned for movement through the respective gaps between the stubs and adjacent collinear arms.

9. Apparatus for alternately coupling each of two loads to a common ultra high frequency energy source, said apparatus comprising a pair of hybrid junctions each having four wave guide arms, means for connecting a first arm of each hybrid junction to the comon source, a second arm of each hybrid junction being connected respectively to one of said loads, shorting means positioned at the end of and terminating a third arm of each of the hybrid junctions, a shorted stub positioned opposite the end of a fourth arm of each of the hybrid junctions, the stubs being axially aligned with said fourth arms and spaced therefrom to provide a gap therebetween, movable shutter means positioned for movement through the respective gaps between the stubs and adjacent arms, and passive network means positioned in each of the arms adjacent the shutter means.

10. Apparatus for alternately coupling each of two loads to a common ultra high frequency energy source, said apparatus comprising a pair of hybrid junctions each having four wave guide arms, means for connecting a first arm of each hybrid junction to the common source, a second arm of each hybrid junction being connected respectively to one of said loads, shorting means positioned at the end of and terminating a third arm of each of the hybrid junctions, a shorted stub positioned opposite the end of a fourth arm of each of the hybrid junctions, the stubs being axially aligned with said fourth arms and spaced therefrom to provide a gap therebetween, and movable shutter means positioned for movement through the respective gaps between the stubs and adjacent arms.

11. Apparatus for alternately coupling each of two loads to a common ultra high frequency energy source, said apparatus comprising a pair of hybrid junctions each having four wave guide arms, means for connecting a first arm of each hybrid junction to the common ultra high frequency source, a second arm of each hybrid junction being connected respectively to one of said separate loads, fixed impedance means terminating a third arm of each of the hybrid junctions, and variable impedance means terminating the fourth arm of each of the hybrid junctions, said variable impedance means including means for simultaneously shifting the phase of each of said variable impedance means in the opposite sense whereby the reactance of the termination of one of said fourth arms is shifted from capacitive to inductive while the reactance of the termination of the other of said fourth arms is shifted from inductive to capacitive.

12. Microwave switching means comprising a hybrid junction including a pair of collinear arms and a pair of branch arms, shorting means positioned at the end of one of the collinear arms, a shorted stub positioned opposite the non-shorted collinear arm and axially aligned therewith, the stub being spaced from the end of the collinear arm to form a gap therebetween, and movable shutter means positioned for movement transversely through the gap, whereby the energy coupled from one branch arm to the other is abruptly changed by action of the shutter means.

13. Microwave switching means comprising a hybrid junction including a pair of collinear arms and a pair of branch arms, first impedance means terminating one of the collinear arms, second impedance means terminating the other collinear arm, one of the collinear arms having a transverse gap in the walls thereof, and movable shutter means positioned for movement transversely through the gap, whereby the energy coupled from one branch arm to the other is abruptly changed by movement of the shutter means.

14. Microwave switching means comprising a hybrid junction including four wave guide arms, first impedance means terminating a first arm, second impedance means terminating a second arm, the first arm having a transverse gap in the walls thereof, and movable shutter means positioned for movement transversely into and out of the gap, whereby the energy coupled between the remaining two arms is abruptly changed by movement of the shutter means.

References Cited in the file of this patent

UNITED STATES PATENTS

| | | |
|---|---|---|
| 2,544,715 | Muchmore | Mar. 13, 1951 |
| 2,545,994 | Gabler | Mar. 20, 1951 |
| 2,596,531 | Clarke | May 13, 1952 |
| 2,602,895 | Hansen | July 8, 1952 |

FOREIGN PATENTS

| | | |
|---|---|---|
| 597,216 | Great Britain | Jan. 21, 1948 |

OTHER REFERENCES

Watson: "Resonant Slots," Journal of I. E. E., vol. 93 Pt. IIIA, No. 4 1946, pp. 761–62.